(12) United States Patent
Louvrier et al.

(10) Patent No.: US 10,750,602 B2
(45) Date of Patent: Aug. 18, 2020

(54) SYSTEM AND METHOD FOR COMPENSATING FOR BACK EMISSION CURRENT IN AN X-RAY GENERATOR

(71) Applicant: GENERAL ELECTRIC COMPANY, Schenectady, NY (US)

(72) Inventors: Yannick Louvrier, Buc (FR); Julien Nicolle, Longjumeau (FR); Christophe Robert, Buc (FR); Elie Herve, Buc (FR); Philippe Ernest, Buc (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 130 days.

(21) Appl. No.: 15/994,141

(22) Filed: May 31, 2018

(65) Prior Publication Data

US 2019/0150256 A1 May 16, 2019

(51) Int. Cl.
| | |
|---|---|
| *H05G 1/10* | (2006.01) |
| *H05G 1/46* | (2006.01) |
| *H02H 7/04* | (2006.01) |
| *H01J 35/06* | (2006.01) |
| *H01J 35/10* | (2006.01) |

(52) U.S. Cl.
CPC ............. *H05G 1/10* (2013.01); *H01J 35/065* (2013.01); *H01J 35/101* (2013.01); *H02H 7/042* (2013.01); *H05G 1/46* (2013.01)

(58) Field of Classification Search
CPC . H05G 1/10; H05G 1/46; H01J 35/065; H01J 35/101; H02H 7/042
USPC .................................. 378/109, 119, 121, 122
See application file for complete search history.

(56) References Cited

U.S. PATENT DOCUMENTS

| | | | |
|---|---|---|---|
| 4,868,842 A | 9/1989 | Dowd | |
| 6,985,557 B2 | 1/2006 | Jaafar | |
| 2004/0114722 A1 | 6/2004 | Shimono | |
| 2006/0023841 A1 | 2/2006 | Beyerlein et al. | |
| 2008/0285716 A1* | 11/2008 | Tang | H05G 1/10 378/112 |
| 2009/0304157 A1 | 12/2009 | Fuerst et al. | |

* cited by examiner

*Primary Examiner* — Courtney D Thomas
(74) *Attorney, Agent, or Firm* — Grogan, Tuccillo & Vanderleeden, LLP (57) ABSTRACT

A system for compensating for a back emission current in an X-ray generator is provided. The system includes a transformer, a common, and a voltage source. The transformer is operative to provide power to an electron emitter of the X-ray generator. The common is electrically coupled to an anode of the X-ray generator. The anode is operative to receive electrons emitted by the electron emitter such that the back emission current is generated between the common and the electron emitter. The voltage source electrically couples the common to the transformer and is operative to generate an offset voltage that reduces the back emission current.

20 Claims, 12 Drawing Sheets

SYSTEM AND METHOD FOR COMPENSATING FOR BACK EMISSION CURRENT IN AN X-RAY GENERATOR

CROSS REFERENCE TO RELATED APPLICATIONS

This application claims priority to and the benefit of French Patent Application Demand No.: 1,760,588 filed on Nov. 10, 2017, which is hereby incorporated by reference in its entirety.

BACKGROUND

Technical Field

Embodiments of the invention relate generally to medical imaging systems, and more specifically, to a system and method for compensating for back emission current in an X-ray generator.

Discussion of Art

Many imaging systems utilize X-ray tubes to generate images of an object. X-ray tubes generally include a cathode with electron emitter disposed at a distance from an anode within a vacuum vessel. The anode usually includes an impact zone that is generally fabricated from a refractory metal with a high atomic number, such as tungsten or tungsten alloy. A voltage difference is maintained between the cathode and the anode such that an electron beam, also referred to herein as the "tube current", is generated by the electron emitter and strikes the anode within the impact zone, typically called the focal spot. As electrons within the electron beam impact the anode, their kinetic energy is converted to high-energy electromagnetic radiation, e.g., X-rays. The precision of the generated X-rays is typically controlled by adjusting the tube current.

As will be understood, generation of the electron beam may create a charge difference between the electron emitter and a common disposed within the X-ray generator. As used herein, the term "common" refers to a conductive material having an electrical potential of the output of a transformer powering the tube current of an X-ray generator/tube, e.g., a wire electrically coupled to the output of the transformer. In some X-ray tubes, the difference in charge between the common and the electron emitter may generate a current, referred to herein as a "back emission current." As will be appreciated, back emission currents, which may be on the order of tens of milliamps (mA)s, often become superimposed onto the tube current so as to impair the precision by which the tube current can be adjusted, and, in turn, the precision of the generated X-rays.

What is needed, therefore, is an improved system and method for compensating for back emission current in an X-ray generator.

BRIEF DESCRIPTION

In an embodiment, a system for compensating for a back emission current in an X-ray generator is provided. The system includes a transformer, a common, and a voltage source. The transformer is operative to provide power to an electron emitter of the X-ray generator. The common is electrically coupled to an anode of the X-ray generator. The anode is operative to receive electrons emitted by the electron emitter such that the back emission current is generated between the common and the electron emitter. The voltage source electrically couples the common to the transformer and is operative to generate an offset voltage that reduces the back emission current.

In another embodiment, a method for compensating for a back emission current in an X-ray generator is provided. The method includes generating an offset voltage via a voltage source that electrically couples a common to a transformer that provides power to an electron emitter of the X-ray generator. The common is further electrically coupled to an anode of the X-ray generator that is operative to receive electrons emitted by the electron emitter such that the back emission current is generated between the common and the electron emitter. The method further includes reducing the back emission current via the offset voltage.

In yet another embodiment, a non-transitory computer readable medium storing instructions is provided. The stored instructions adapt a processor to generate an offset voltage via a voltage source that electrically couples a common to a transformer that provides power to an electron emitter of the X-ray generator. The common is further electrically coupled to an anode of the X-ray generator operative to receive electrons emitted by the electron emitter such that the back emission current is generated between the common and the electron emitter. The stored instructions further adapt the processor to reduce the back emission current via the offset voltage.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time," as used herein, means a level of processing responsiveness that a user senses as sufficiently immediate or that enables the processor to keep up with an external process. As further used herein, the terms "imaging procedure" and/or "medical imaging procedure" refer to a medical procedure that involves an imaging system to assist in accomplishing one or more tasks such as, by way of non-limiting examples, deploying/installing a stent into a blood vessel, locating an ulcer, imaging a clogged artery, suturing a patient, and/or other medical processes. The term "vacuum," as used herein, means a pressure of about zero (0) psi.

As will be explained in greater detail below, embodiments of the present invention provide for systems and methods of compensating for a back emission current within an X-ray generator via an offset voltage generated by a voltage source that electrically couples a transformer that powers an electron emitter to a common. Generation of the offset voltage on/in the common decreases the charge imbalance between the electron emitter and the common such that the back emission current is compensated, i.e., reduced and/or eliminated.

Additionally, while the embodiments disclosed herein are described with respect to an X-ray based imaging system, e.g., a computed tomography ("CT") imaging system, it is to be understood that embodiments of the present invention are equally applicable to other devices and/or imaging systems which generate electromagnetic waves/radiation via striking an anode with an electron beam. Further, embodiments of the present invention related imaging systems may be used to analyze objects within any material which can be internally imaged, generally. As such, embodiments of the present invention are not limited to analyzing objects within human tissue.

Figure 1:
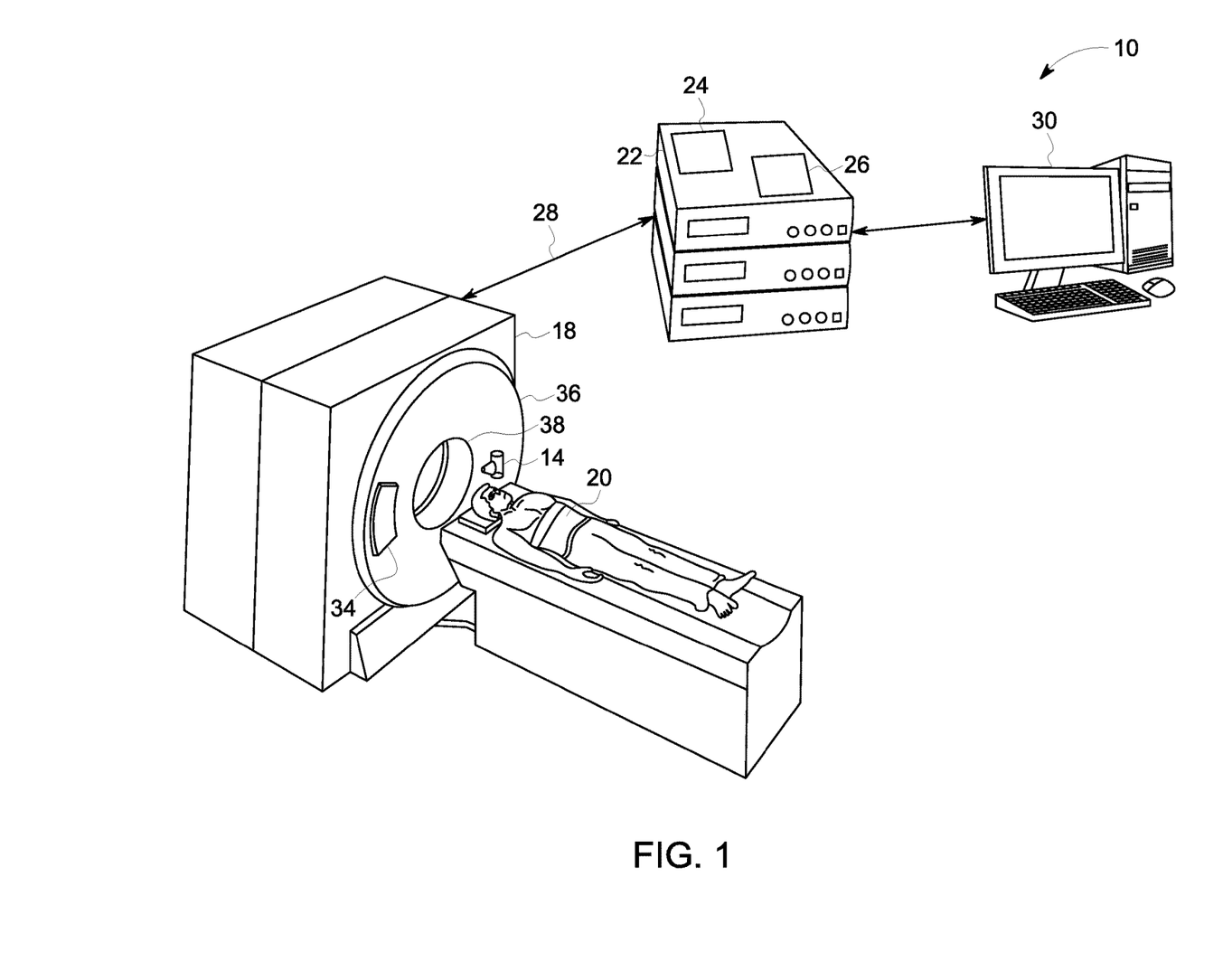
FIG. 1 is a schematic diagram of an imaging system that includes an electromagnetic ray generator having a system for compensating for a back emission current, in accordance with an embodiment of the present invention.

Accordingly, referring now to FIG. 1, the major components of an imaging system 10 that includes a system 12 (best seen in FIGS. 6 and 7) for compensating for a back emission current in an X-ray generator 14 (best seen in FIGS. 3-5), in accordance with an embodiment of the present invention, are shown. As shown in FIG. 1, the imaging system 10 includes a detector assembly 18 that is utilized to scan a patient 20, and a controller 22, which includes at least one processor 24 and a memory device 26. The controller 22 may electronically communicate with the detector assembly 18 via one or more communication links 28 over which data generated by the detector assembly 18 may be passed to the controller 22. As will be appreciated, in embodiments, the imaging system 10 may further include a human-machine interface ("HMI") 30, i.e., a work station, that provides for a user/technologist/physician to interact with the imaging system 10 and/or system 12. The imaging system 10 may further include a table 32 for supporting the patient 20 during scanning for a medical imaging procedure.

Figure 2:
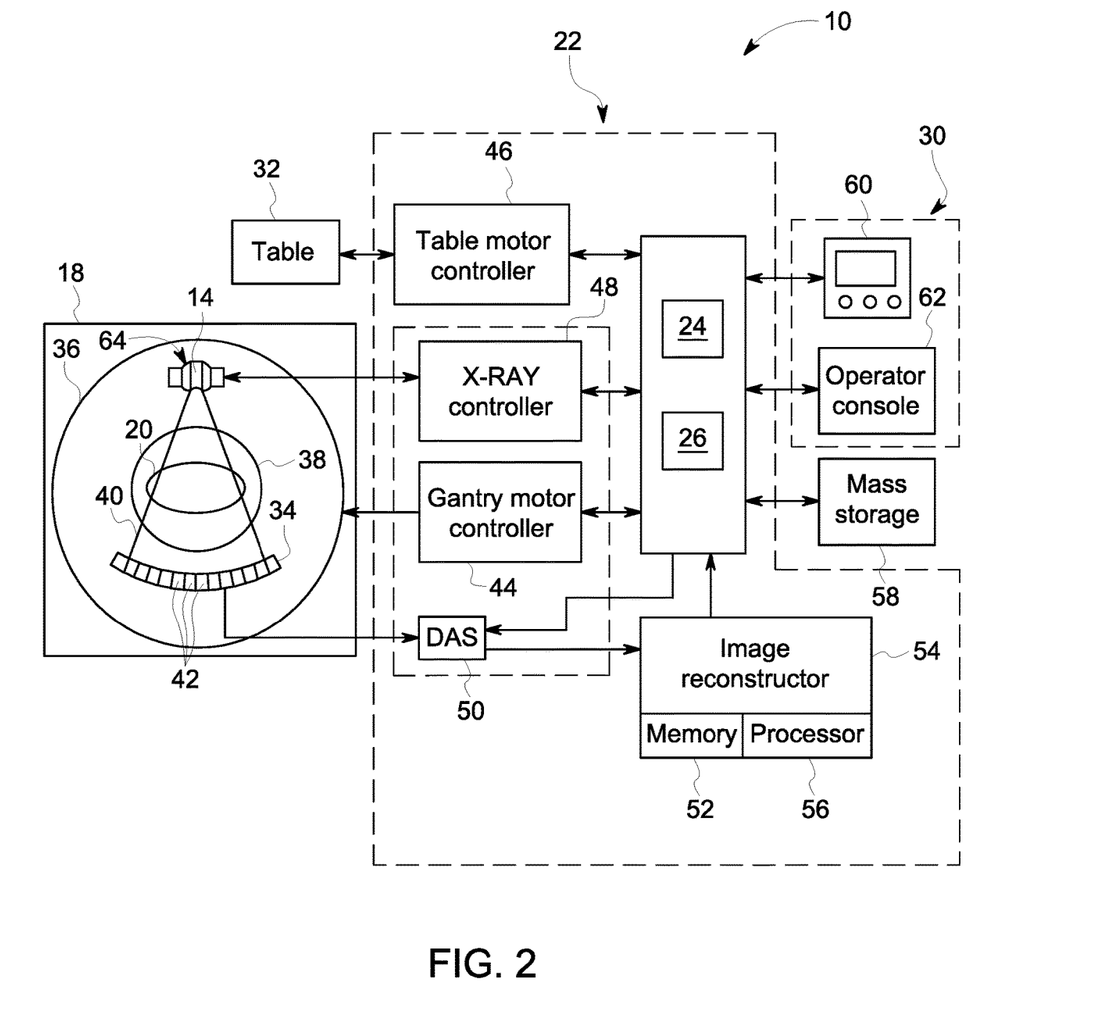
FIG. 2 is a block diagram of the imaging system of FIG. 1, in accordance with an embodiment of the present invention.

As illustrated in FIG. 2, the detector assembly 18 may include the electromagnetic ray generating device/ray generator 14 and a radiation detector 34 disposed within a rotating gantry 36 opposite one another. As will be understood, the patient 20 is positioned within a bore 38 of the gantry 36, and X-rays 40 generated/projected by the electromagnetic ray generator 14 are received by the radiation detector 34 after having passed through the patient 20 while the gantry 36 rotates about the patient 20. The radiation detector 34 may include an array of detector elements 42, each of which produces an electric signal representative of an impinging X-ray 40 beam. While the rays 40 generated by the electromagnetic ray generator 14 are disclosed herein as being X-rays, it will be understood that, in embodiments, the rays 40 may be other types of electromagnetic rays/waves, e.g., gamma rays, infrared waves, radio waves, etc.

The controller 22 may include a gantry motor controller 44, a table motor controller 46, a ray controller 48, and a data acquisition system ("DAS") 50. The table motor controller 46 governs actuation of a motor that moves the table 32 in relation to the detector assembly 18, the gantry motor controller 44 controls the rotational direction and/or speed of the gantry 36, the ray controller 48 provides power and timing signals to the ray generator 14, and the DAS 50 samples analog projection data from the detector elements 42 and converts the analog data to digital projection data for subsequent processing. For example, in embodiments, the digital projection data may be loaded from the DAS 50 into a memory 52 device of an image reconstructor 54 where it is used by a processor 56 to reconstruct one or more images via a reconstruction algorithm. The one or more images may then be sent to the HMI 30 and/or a mass storage device 58, e.g., a large computerized data storage apparatus such as a network attached storage ("NAS") device.

The HMI 30 includes a monitor 60 for displaying the reconstructed images, and a console 62, e.g., buttons, dials, a touch screen, a keyboard, and/or a mouse, for receiving command/scanning parameters from an operator of the systems 10 and/or 12.

Figure 3:
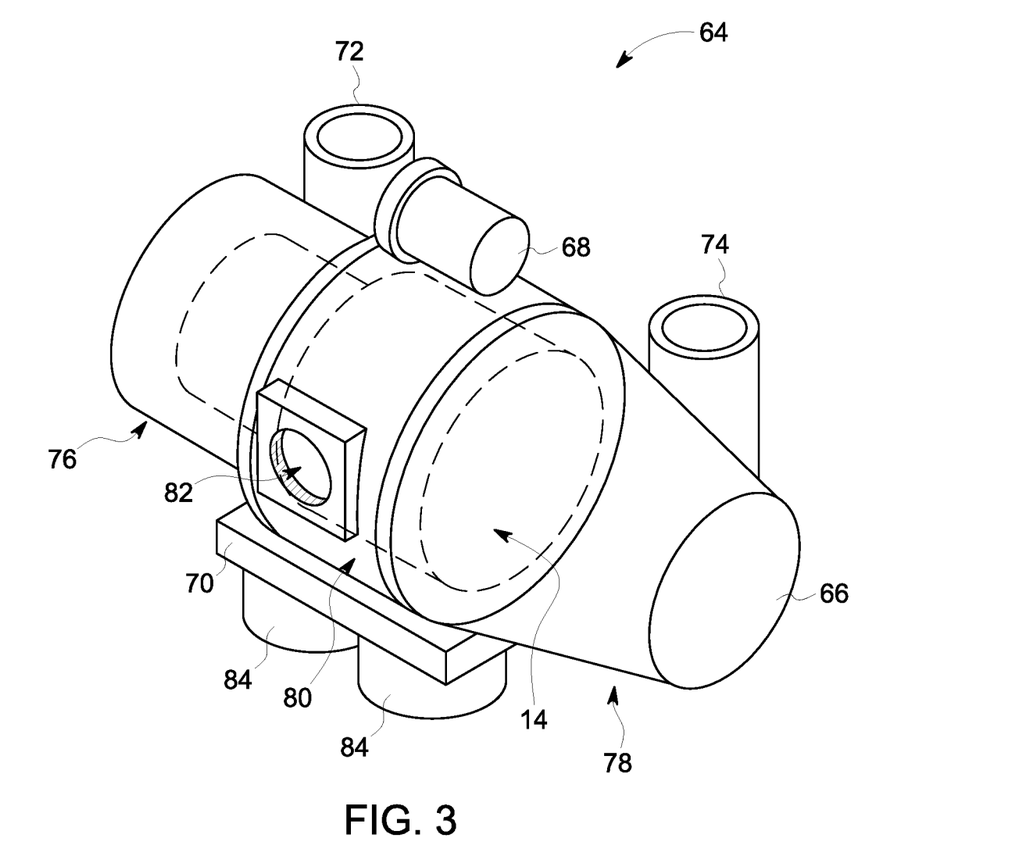
FIG. 3 is a diagram of a housing unit for the electromagnetic ray generator of the imaging system of FIG. 1, in accordance with an embodiment of the present invention.

Turning now to FIG. 3, the ray generator 14 may be disposed within a housing unit 64 which may include a container 66, a pump 68, a radiator 70, an anode receptacle 72, and/or a cathode receptacle 74.

The container 66 may be formed from lead and have an anode end 76, a cathode end 78, and a center section 80 disposed therebetween with an aperture/window 82. The ray generator 14 may be contained within the container 66 such that the generated rays 40 (FIG. 2) are able to pass through the aperture 82. The container 66 may be filled with air or a fluid, e.g., dielectric oil/transformer oil which, as will be discussed in greater detail below, is circulated throughout the container 66 via the pump 68 so as to cool/transfer heat away from the ray generator 14.

The radiator 70 may be disposed to one side of the center section 80 and fluidly connected to the interior of the container 66 such that the radiator 70 is able to cool the fluid by absorbing and radiating heat from it into the surrounding atmosphere. As shown in FIG. 3, in embodiments, the radiator 70 may include one or more fans 84 for providing a cooling air flow over the radiator 70 as the fluid circulates through it.

The anode 72 and cathode 74 receptacles serve as conduits through which electrical connections may be made to the ray generator 14 within the container 66.

Figure 4:
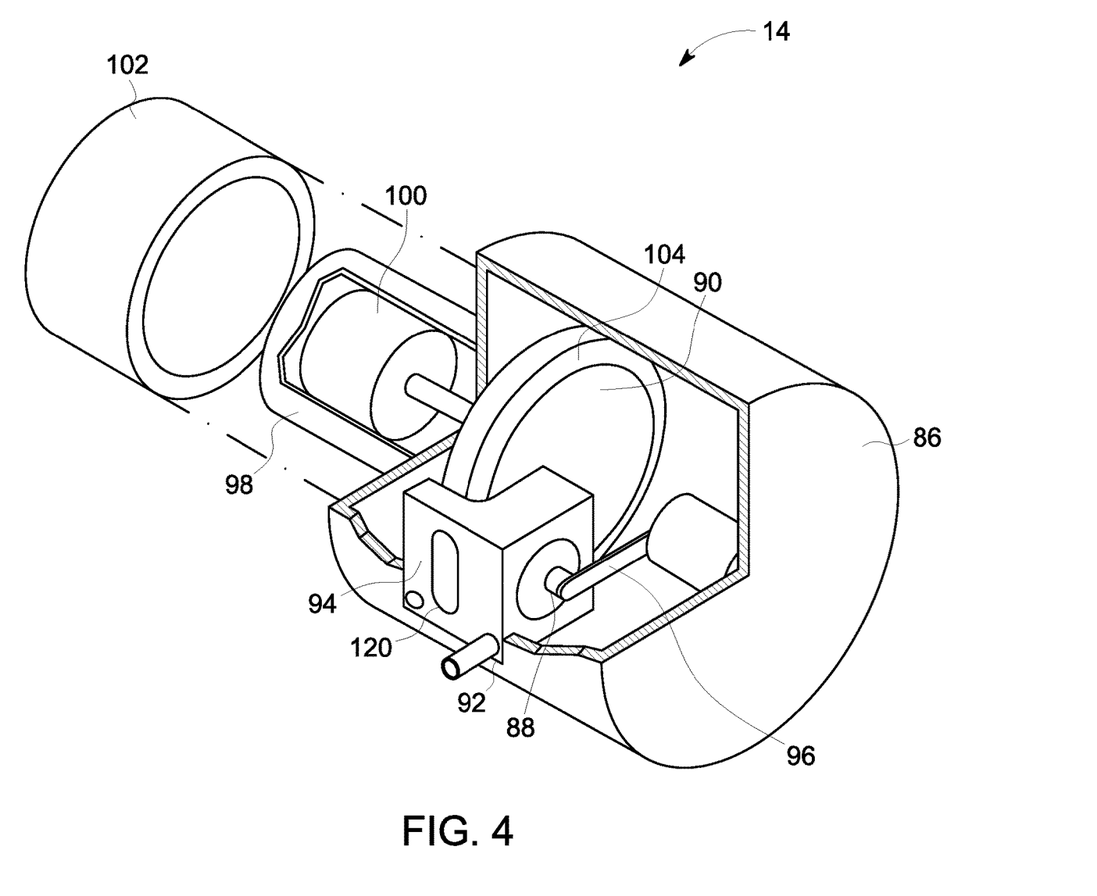
FIG. 4 is a perspective view of the electromagnetic ray generator of the imaging system of FIG. 1, wherein a motor of the electromagnetic ray generator has been exploded to reveal a stator, and wherein a portion of a vacuum vessel of the electromagnetic ray generator and a portion of the stator have been cutaway to reveal an anode of the electromagnetic ray generator mounted to a rotor of the motor, in accordance with an embodiment of the present invention.

Moving to FIG. 4, the ray generator 14 includes a vacuum enclosure/vessel 86 within which a vacuum and/or a near vacuum is maintained. The ray generator 14 further includes a cathode 88, an anode 90, and an electron collector 92, all of which are disposed within the vacuum vessel 86. The vacuum vessel 86 further includes an aperture 94 that aligns with the aperture 82 (FIG. 3) of the container 66 (FIG. 3). In embodiments, the electron collector 92 may partially protrude from the vacuum vessel 86 such that the vacuum within the vessel 86 is maintained. The cathode 88 may be mounted to the vacuum vessel 86 via an arm 96 and positioned such that it faces the anode 90. The anode 90 may be configured to rotate in relation to the cathode 88. For example, in embodiments, the ray generator 14 may further include a motor formed by a stator 98 fastened to the vacuum vessel 86 and a rotor 100 mounted to the anode 90. As will be appreciated, the motor may be electric, pneumatic, or hydraulic, and/or disposed within a casing 102 that may be mounted to the vacuum vessel 86. The anode 90 may be a circular disk with a target track 104, e.g., a tungsten ring, disposed along the circumference of the anode 90 which aligns with the cathode 88. As will be appreciated, while the figures provided herein depict the ray generator 14 as including the vacuum vessel 86, it will be understood that, in other embodiments, the ray generator 14 may not include the vacuum vessel 86.

Figure 5:
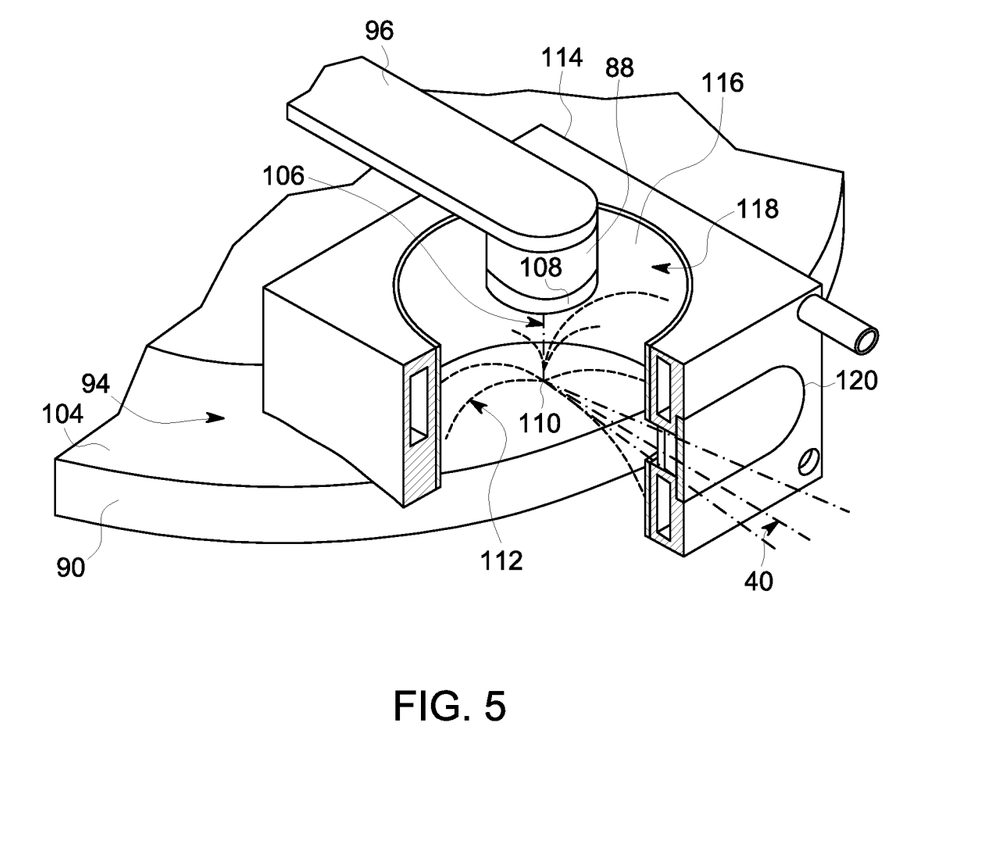
FIG. 5 is a close up perspective view of an electron collector disposed within the electromagnetic ray generator of FIG. 4, wherein a portion of the electron collector has been cutaway to reveal a focal point of an electron beam on the anode, in accordance with an embodiment of the present invention.

Turning to FIG. 5, in operation, a voltage is maintained between the cathode 88 and the anode 90 such that an electron beam 106, i.e., a continuous stream of individual electrons, is generated/produced by/at an emitter 108 of the cathode 88 and strikes the anode 90 at a focal point 110 that falls within the target track 104. Upon striking the anode 90, the kinetic energy of some of the electrons within the electron beam 106 is converted into electromagnetic waves, i.e., the X-rays 40, which radiate out in all directions from the focal point 110. The focal point 110 and/or anode 90, however, may be located within the vacuum vessel 86 (FIG. 4) so as to increase the likelihood that individual X-rays 40 generated by the electrons striking the focal point 110 will pass through the apertures 82 (FIG. 3) and 94 (FIG. 4). As will be appreciated, the striking of anode 90 by the electron beam 106 generates heat within the portion of the anode 90 occupying the focal point 110. Accordingly, in embodiments, the anode 90 may be rotated by the rotor 100 so that the point of the target track 104 aligning with the focal point 110 shifts over time to provide points of the target track 104 an opportunity to cool in between cycles of being struck by the election beam 106.

As will be understood, some of the electrons 112 within the beam 106 backscatter away from the focal point 110 after striking the anode 90. In particular, some of the backscattered electrons 112 will be additionally deflected about ninety degrees (90°) or more by the negative electric charge of the electron beam 106 and/or cathode 88, and thus follow a curved path that re-strikes the anode 90 at a point other than the focal point 110, which, without the electron collector 92, would generate off-focal electromagnetic rays and/or additional/unwanted heat within the anode 90.

Accordingly, the electron collector 92 has a body 114 that includes/defines a surface/interface 116 configured to intercept the backscattered electrons 112 so as to prevent them from re-striking the anode 90. For example, as shown in FIG. 5, the surface 116 may have a shape, e.g., cylindrical, spherical, rectangular, etc., that occupies space intercepting possible trajectories/paths of the backscattered electrons 112. In embodiments, the surface 116 defines a cavity 118 within which the electron beam 106 strikes the anode 90. As will be understood, backscattered electrons 112 that intercept/strike the surface 116 are subsequently absorbed by the body 114 such that their kinetic energy is transformed into heat.

As will be appreciated, the body 114 may also serve as a collimator with respect to the X-rays 40 emitted from the anode 90. For example, as further shown in FIG. 5, the body 114 may include an aperture 120 that aligns with apertures 82 (FIG. 3) and 94 (FIG. 4) such that X-rays 40 having a trajectory/path aligned with the apertures 82, 94, and 120 may pass through the body 114, vacuum vessel 86 (FIG. 4), and fluid container 66 (FIG. 3), while X-rays 40 having trajectory/paths not aligned with the apertures 82, 94, and 120 are restricted from passing through the body 114. In embodiments, the electron collector 92 collimates the generated X-ray 40 such that the X-rays 40 passing through the apertures 82, 94, and 120 define a beam with a sharp edge. In certain aspects, the electron collector 92 may include additional radiation shielding, e.g., lead, in the casing of an insert that surrounds the ray generator 14.

Figure 6:
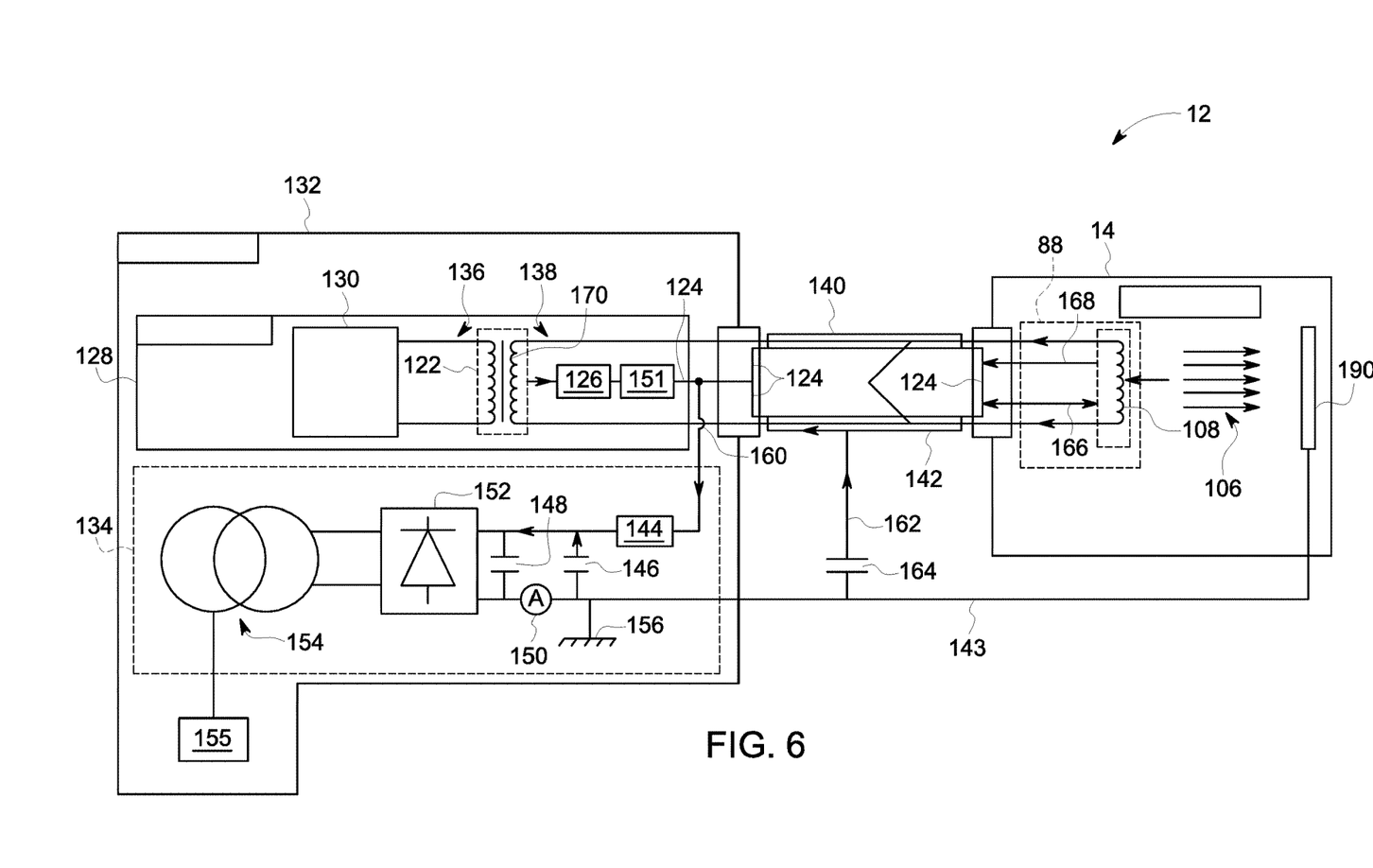
FIG. 6 is a block diagram of the system for compensating for a back emission current of the electromagnetic ray generator of the imaging system of FIG. 1, in accordance with an embodiment of the present invention.
Figure 7:
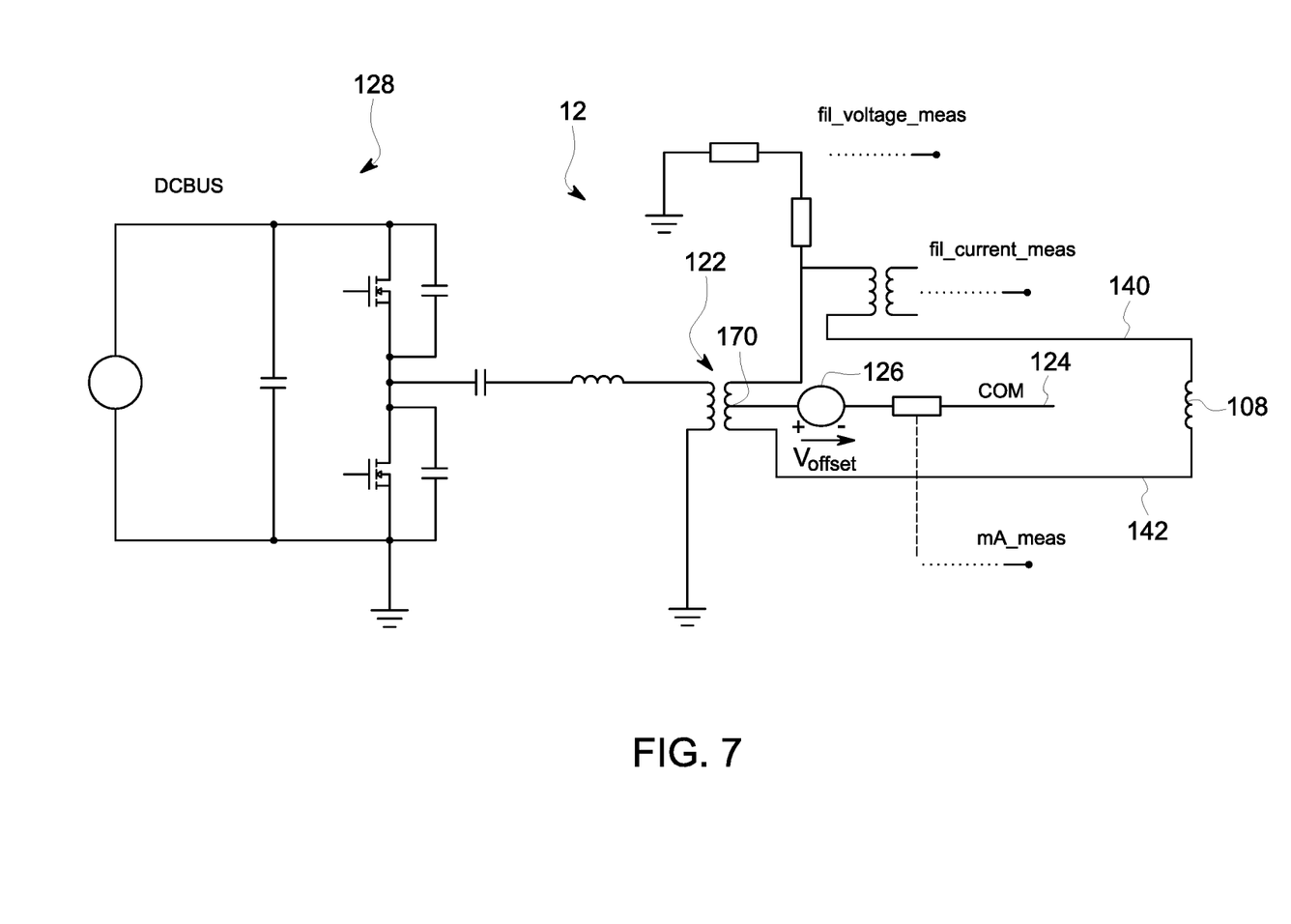
FIG. 7 is an electronic schematic of the system for compensating for a back emission current of FIG. 6.

Moving to FIGS. 6 and 7, a block diagram (FIG. 6) and corresponding electronic circuit diagram (FIG. 7) of the system 12 for compensating for a back emission current in the X-ray generator 14 are shown. The system 12 includes a transformer 122, a common 124, and a voltage source 126. The transformer 122 is operative to provide power to the electron emitter 108, the common 124 is electrically coupled to the anode 90, and the voltage source 126 electrically couples the common 124 to the transformer 122. In embodiments, the transformer 122 may be disposed on a power supply board ("PS board") 128 that also includes an emitter/filament invertor 130 so as to collectively form a power source 132. In embodiments, the power source 132 may include a high voltage power source 134 coupled to the common 124 and the X-ray generator/tube 14.

As further shown in FIG. 6, the primary side 136 of the transformer 122 may be electrically coupled to the inverter 130 and the secondary side 138 of the transformer 122 may be electrically coupled to the electron emitter 108 via wires/cables 140 and 142. In embodiments, the wires/cables 140 and 142 may be high voltage cables that include various layers of shielding with the tube current flowing from the transformer 122 to the emitter 108 via wire 140, then to anode 90 via electron beam 106, and returning back to the transformer 122 via wire 143. In embodiments, the primary side 136 of the transformer 122 may have a voltage of between about five-point three (5.3) Vrms to about twenty-five (25) Vrms with a current of between about three-point-three (3.3) Arms to about sixteen (16) Arms, and the secondary side 138 of the transformer may have a voltage of between about six-point-seven (6.7) Vrms to about thirty-one (31) Vrms with a current of between about two-point-five (2.5) Arms to about twelve (12) Arms.

In embodiments, the high voltage power source/generator 134 may include one or more damping resistors 144, capacitors 146 and 148, current shunt resisters 150, diodes 152, high voltage transformers 154, an inverter 155, ground connections 156, and/or other electrical devices suitable for generating high voltages. In embodiments, the high voltage power source/generator 134 may electrically couple the anode 90 to the common 124 via wires 143 and 160. In some embodiments, wire 143 may be further electrically coupled to the secondary side 138 of the transformer 122 via wire 162 which may include a capacitor 164.

As further shown in FIG. 6, in embodiments, the electron emitter 108 may be floating with respect to the common 124. In other words, the electron emitter 108 may not be directly connected/grounded to the common 124 such that a space 166 exists between the common 124 and the electron emitter 108 and/or cathode 88.

Additionally, in embodiments, a current shunt resistor 151 may be electrically coupled to the common 124 such that current shunt resistor 150 measures/senses the low side/low voltage for the tube current, while current shunt resistor 151 measures/senses the high side/high voltage for the tube current. In other words, the current shunt resistors 150 and 151 measure/sense the tube current between the anode 90 and the cathode 88. As will be understood, other types of sensors may be disposed within the system 12 to measure the tube current.

As will be appreciated, generation of the electron beam 106 by the flow of electrons from the electron emitter 108 to the anode 90, as described above, results in the buildup of a charge between the emitter 108 and the common 124. As will be further appreciated, the electrical field created by the potential difference between the common 124 and the electron emitter 108, when of a positive value, may result in the generation of a back emission current (represented by arrow 168) between the common 124 and the electron emitter 108 that, in embodiments, may take the form of a rectified current superimposed onto the tube current. In embodiments, the back emission current 168 may be about zero (0) mA to about fifty (50) mA. As will be understood, if uncompensated for, the back emission current 168 may decreases the accuracy and/or inhibit the ability of the current shunt resistors 150 and 151, or other sensors, to measure the tube current, which in turn, may reduce the overall precision of the X-ray generator 14, i.e., the ability of the X-ray generator 14 to precisely control the amount and/or type of X-rays 40 generated.

Embodiments of the present invention, however, compensate for the back emission current 168 by generating an offset voltage via the voltage source 126. As will be appreciated, the offset voltage reduces the charge difference between the common 124 and the electron emitter 108, which in turn reduces and/or eliminates the flow of electrons across the space 166 from the electron emitter 108 to the common 124. As the electron emitter 108, in some embodiments, may be supplied with electrical power via a resonant converter with a transformer, to adapt the gain and to measure the tube current, the voltage source 126 may be electrically coupled to a middle point 170 of the transformer 122. Thus, as will be appreciated, in embodiments, the properties of the offset voltage, i.e., phase, magnitude, frequency, etc., may be based at least in part on the tube current, i.e., the properties of the current on the secondary side 138 of the transformer 122. In other words, the voltage source 126 may be powered by the transformer 122. As such, in embodiments, the offset voltage may be between about seven (7) V to about twenty (20) V. Accordingly, in embodiments, the offset voltage may be about twenty (20) volts. The electronic coupling of the voltage source 126 to the transformer 122, as shown herein, may also provide for short circuits, i.e., "spit current", to flow through the voltage source 126.

Figure 8:
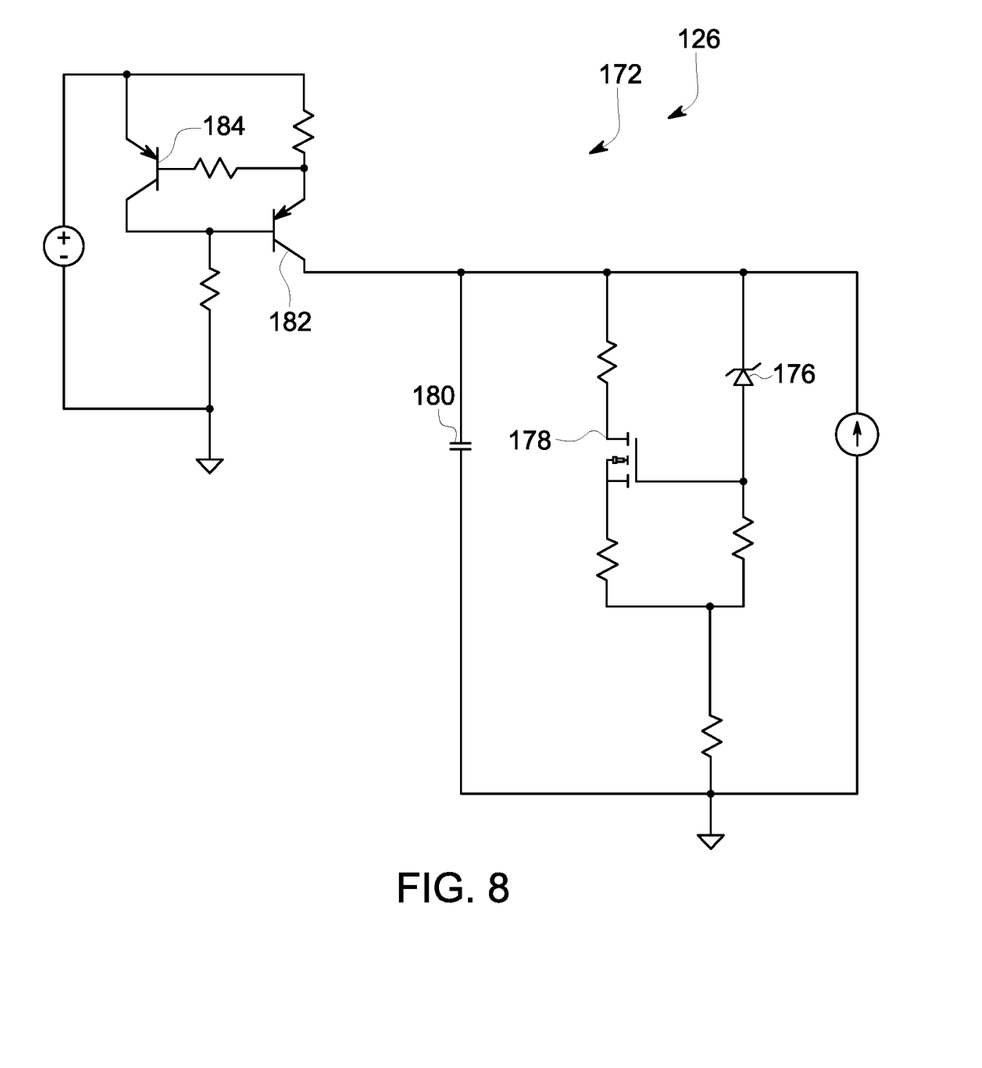
FIG. 8 is an electronic schematic of a first embodiment of a voltage source of the system for compensating for a back emission current of FIGS. 6 and 7, in accordance with an embodiment of the present invention.
Figure 9:
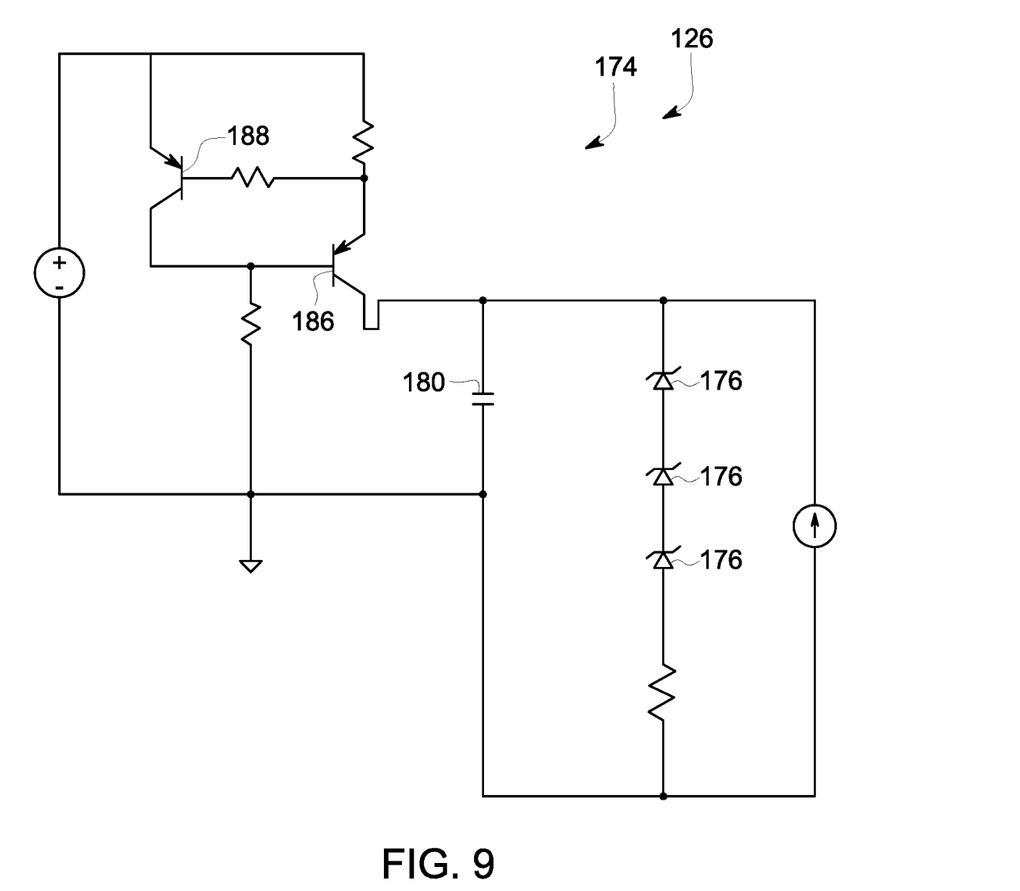
FIG. 9 is an electronic schematic of a second embodiment of the voltage source of the system for compensating for a back emission current of FIGS. 6 and 7, in accordance with an embodiment of the present invention.

FIGS. 8 and 9 illustrate two embodiments 172 (FIG. 8) and 174 (FIG. 9) of the voltage source 126 (FIGS. 6 and 7), both of which include at least one Zener diode 176 which generates/creates an offset between the mid-point of the secondary side of the transformer 122 and the common 126. As shown in FIG. 8, in embodiments, the voltage source 172 may further include a transistor 178, e.g., a MOSFET, electrically coupled in parallel the at least one Zener diode 176, which may result in a breakdown voltage of about twelve volts (12V). The voltage source 172 may further include a capacitor 180 also electrically coupled in parallel to the at least one Zener diode 176 which, in embodiments, may protect the voltage source 172 from short circuits/spit currents. The at least one Zener diode 176 and/or the transistor 178 may be polarized via one or more transistors 182 (Q1) and 184 (Q2). The capacitor 180 may also filter the tube current measurement with a time constant of about two-point-five (2.5) us, e.g., 1 uF×2.5 Ohm=2.5 us.

As shown in FIG. 9, in embodiments, the voltage source 174 may include two or more Zener diodes 176 electrically coupled to each other in series. Such embodiments may lack a transistor 178 (FIG. 8) electrically coupled in parallel with the Zener diodes 176. Similar to the voltage source 172 shown in FIG. 8, the voltage source 174 may include a capacitor 180 electrically coupled in parallel to the two or more Zener diodes 176, as well as one or more transistors 186 (Q3) and 188 (Q4) for polarizing the two or more Zener diodes 176. In embodiments, the voltage source 174 may include three (3) Zener diodes in series with a breakdown voltage of about six volts (6V).

Figure 10:
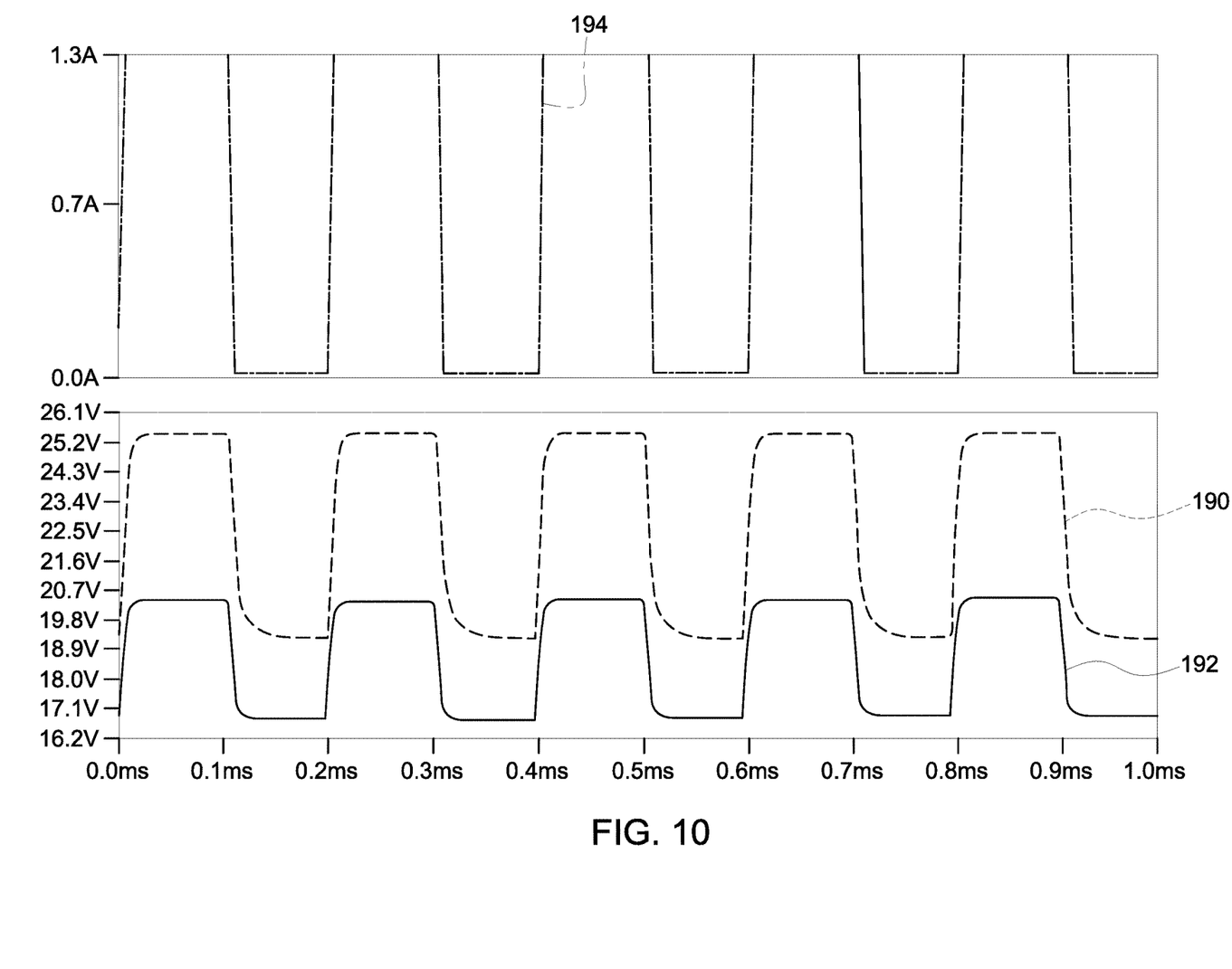
FIG. 10 is a chart depicting offset voltages generated by the voltage sources of FIGS. 8 and 9 as a function of a tube current of the electromagnetic ray generator of FIG. 4, in accordance with an embodiment of the present invention.

Shown in FIG. 10 is a chart that depicts the offset voltages 190 and 192 respectively generated by the voltage sources 172 and 174 as a function of the tube current 194. As will be appreciated, by using two or more Zener diodes 176 electrically coupled/connected in series, voltage source 174 achieves the same general function/wave form for the offset voltage, as voltage source 172, but with improved sensitivity to the variations in the tube current 194. In other words, the offset voltage 192 generated by the voltage source 174 has the same general square wave form as offset voltage 190 generated by the voltage source 172, while achieving lower differences between the peaks and troughs.

Figure 11:
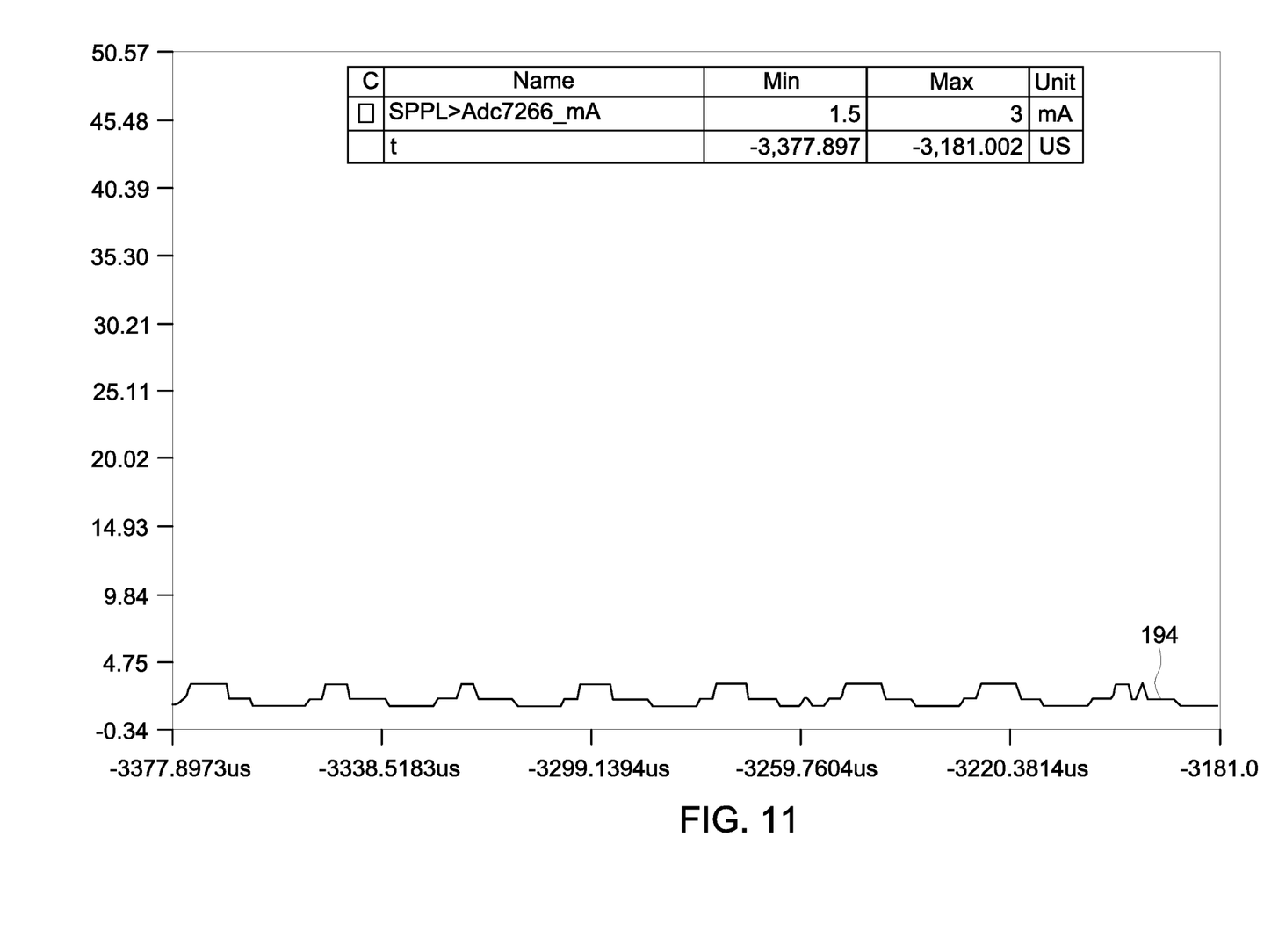
FIG. 11 is a chart depicting a tube current of the electromagnetic ray generator of FIG. 4, in accordance with an embodiment of the present invention.
Figure 12:
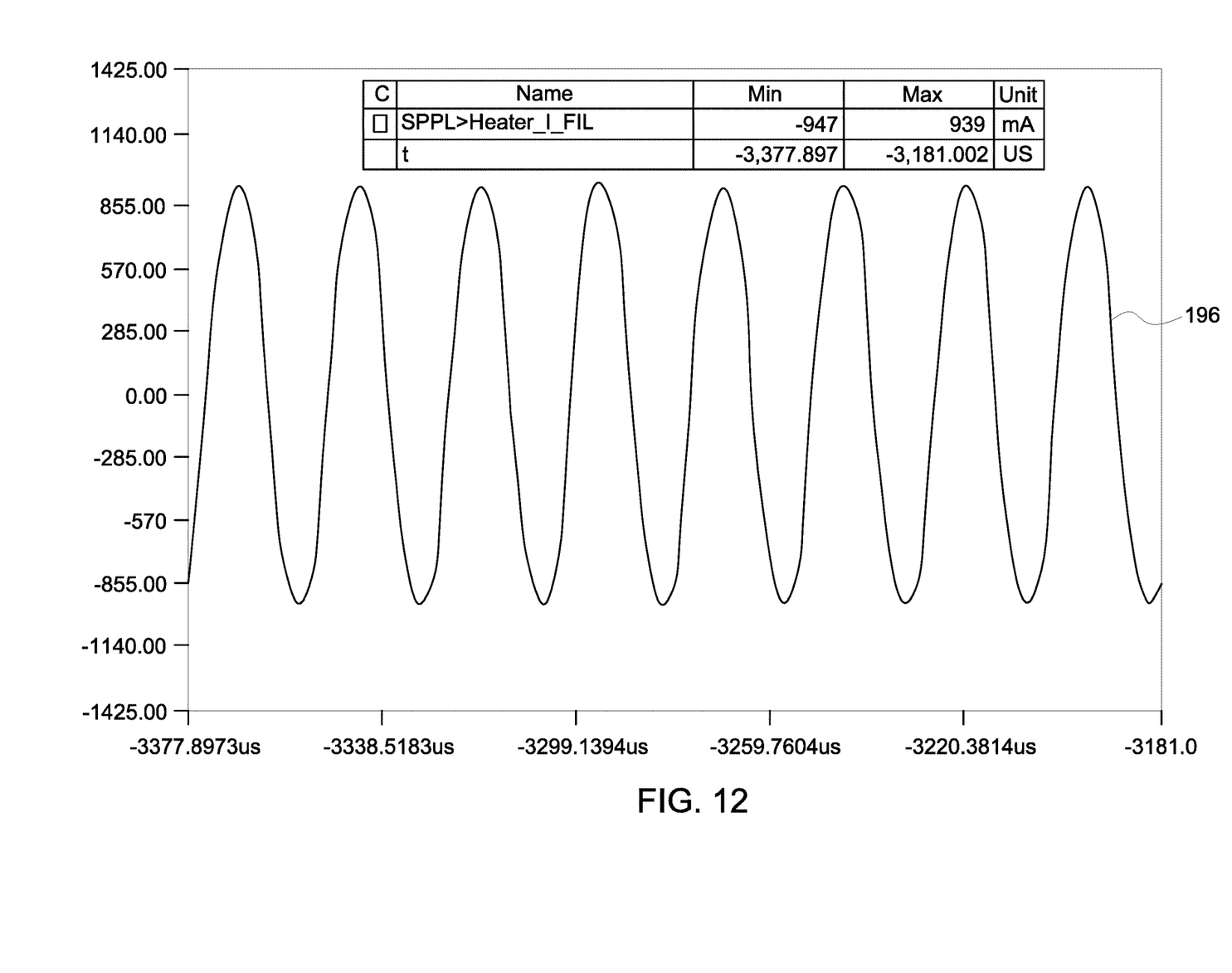
FIG. 12 is a chart depicting an emitter current of the electromagnetic ray generator of FIG. 4, in accordance with an embodiment of the present invention.

Illustrated in FIGS. 11 and 12 are two charts depicting the tube current 194 (FIG. 11) and the emitter current 196 (FIG. 12), i.e., the current flowing from the transformer 122 (FIG. 6), through wire 140 (FIG. 6) to the emitter 108 (FIG. 6), and from the emitter 108 through wire 142 (FIG. 6) back to the transformer 122, over time. As can be seen in FIGS. 11 and 12, generation of the offset voltage via the voltage source 126 (FIGS. 6, 7, and 8), as described above, substantially and/or completely cancels the effect of the back emission current 168 (FIG. 6) on the tube current 194. In other words, any effects/impacts of large variations in the emitter current 196 are reduced and/or eliminated in the tube current 194.

For example, in the absence of the offset voltage, the back emission current 168 corresponding to the emitter current 196 as shown in FIG. 12 would ordinarily cause the current shunt resistors 150 and 151 to measure the tube current 194 as varying between about ten (10) mA to about thirty-seven (37) mA. As shown in FIG. 11, however, the offset voltage compensates for the back emission current 168 such that the current shunt resistors 150 and 151 measure the tube current 194 as varying between about one-point-five (1.5) mA to about three (3) mA.

Finally, it is also to be understood that the imaging systems 10 and/or 12 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be accomplished in real-time. For example, as previously mentioned, the systems may include at least one processor and system memory/data storage structures, which may include random access memory (RAM) and read-only memory (ROM). The at least one processor of the system may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium," as used herein, refers to any medium that provides or participates in providing instructions to the at least one processor of the systems 10 and/or 12 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for compensating a back emission current in an X-ray generator is provided. The system includes a transformer, a common, and a voltage source. The transformer is operative to provide power to an electron emitter of the X-ray generator. The common is electrically coupled to an anode of the X-ray generator. The anode is operative to receive electrons emitted by the electron emitter such that the back emission current is generated between the common and the electron emitter. The voltage source electrically couples the common to the transformer and is operative to generate an offset voltage that reduces the back emission current. In certain embodiments, the electron emitter is floating with respect to the common. In certain embodiments, the voltage source is electrically coupled to the transformer at a middle point of the transformer. In certain embodiments, the voltage source includes at least one Zener diode. In certain embodiments, the voltage source further includes a transistor electrically coupled in parallel to the at least one Zener diode. In certain embodiments, the transistor is a MOSFET. In certain embodiments, the voltage source further includes a capacitor electrically coupled in parallel to the at least one Zener diode. In certain embodiments, the voltage source includes two or more Zener diodes electrically coupled to each other in series. In certain embodiments, the offset voltage is between about seven (7) V to about twenty (20) V. In certain embodiments, the offset voltage is about twenty (20) volts.

Other embodiments provide for a method for compensating for a back emission current in an X-ray generator. The method includes generating an offset voltage via a voltage source that electrically couples a common to a transformer that provides power to an electron emitter of the X-ray generator. The common is further electrically coupled to an anode of the X-ray generator that is operative to receive electrons emitted by the electron emitter such that the back emission current is generated between the common and the electron emitter. The method further includes reducing the back emission current via the offset voltage. In certain embodiments, the electron emitter is floating with respect to the common. In certain embodiments, the voltage source is electrically coupled to the transformer at a middle point of the transformer. In certain embodiments, the method further includes polarizing at least one Zener diode of the voltage source. In certain embodiments, the method further incudes polarizing at least one transistor electrically coupled in parallel to the at least one Zener diode. In certain embodiments, the method further includes filtering a tube current of the X-ray generator via a capacitor disposed in parallel with the at least one Zener diode. In certain embodiments, the offset voltage is between about seven (7) V to about twenty (20) V. In certain embodiments, the offset voltage is about twenty volts.

Yet still other embodiments provide for a non-transitory computer readable medium storing instructions. The stored instructions adapt a processor to generate an offset voltage via a voltage source that electrically couples a common to a transformer that provides power to an electron emitter of the X-ray generator. The common is further electrically coupled to an anode of the X-ray generator operative to receive electrons emitted by the electron emitter such that the back emission current is generated between the common and the electron emitter. The stored instructions further adapt the processor to reduce the back emission current via the offset voltage. In certain embodiments, the electron emitter is floating with respect to the common.

Accordingly, as will be appreciated, by compensating for back emission current generated by a floating electron emitter via a positive offset voltage, some embodiments of the present invention provide for improved/more accurate measurements of the tube current of an encompassing X-ray generator at low values, which, in turn, may also improve the precision of the X-ray generator.

Further, by electrically coupling the voltage source to the transformer, some embodiments of the present invention provide for compensation of back emission current without effecting dynamic control loops used to regulate the tube current.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for compensating for a back emission current in an X-ray generator, the system comprising:
   a transformer operative to provide power to an electron emitter of the X-ray generator;
   a common electrically coupled to an anode of the X-ray generator, the anode operative to receive electrons emitted by the electron emitter such that a back emission current is generated between the common and the electron emitter; and
   a voltage source that electrically couples the common to the transformer and is operative to generate an offset voltage that reduces the back emission current.

2. The system of claim 1, wherein the electron emitter is floating with respect to the common.

3. The system of claim 1, wherein the voltage source is electrically coupled to the transformer at a middle point of the transformer.

4. The system of claim 1, wherein the voltage source includes at least one Zener diode.

5. The system of claim 4, wherein the voltage source further includes a transistor electrically coupled in parallel to the at least one Zener diode.

6. The system of claim 5, wherein the transistor is a MOSFET.

7. The system of claim 4, wherein the voltage source further includes a capacitor electrically coupled in parallel to the at least one Zener diode.

8. The system of claim 1, wherein the voltage source includes two or more Zener diodes electrically coupled to each other in series.

9. The system of claim 1, wherein the offset voltage is between about 7 V to about 20 V.

10. The system of claim 9, wherein the offset voltage is about twenty volts.

11. A method for compensating for a back emission current in an X-ray generator, the method comprising:
    generating an offset voltage via a voltage source that electrically couples a common to a transformer that provides power to an electron emitter of the X-ray generator, the common further electrically coupled to an anode of the X-ray generator operative to receive electrons emitted by the electron emitter such that a back emission current is generated between the common and the electron emitter; and
    reducing the back emission current via the offset voltage.

12. The method of claim 11, wherein the electron emitter is floating with respect to the common.

13. The method of claim 11, wherein the voltage source is electrically coupled to the transformer at a middle point of the transformer.

14. The method of claim 11 further comprising:
    polarizing at least one Zener diode of the voltage source.

15. The method of claim 14 further comprising:
    polarizing at least one transistor electrically coupled in parallel to the at least one Zener diode.

16. The method of claim 14 further comprising:
    filtering a tube current of the X-ray generator via a capacitor disposed in parallel with the at least one Zener diode.

17. The method of claim 11, wherein the offset voltage is between about 7 V to about 20 V.

18. The method of claim 17, wherein the offset voltage is about twenty volts.

19. A non-transitory computer readable medium storing instructions that adapt a processor to:
    generate an offset voltage via a voltage source that electrically couples a common to a transformer that provides power to an electron emitter of an X-ray generator, the common further electrically coupled to an anode of the X-ray generator operative to receive electrons emitted by the electron emitter such that the back emission current is generated between the common and the electron emitter; and reduce the back emission current via the offset voltage.

20. The non-transitory computer readable medium of claim 19, wherein the electron emitter is floating with respect to the common.

* * * * *